United States Patent [19]

Jackson, Jr.

[11] 4,055,974

[45] Nov. 1, 1977

[54] DISINTEGRATABLE FERTILIZER TABLET

[75] Inventor: Laban P. Jackson, Jr., Lexington, Ky.

[73] Assignee: International Spike, Inc., Lexington, Ky.

[21] Appl. No.: 664,284

[22] Filed: Mar. 5, 1976

[51] Int. Cl.² .......................... C05F 11/00; C05C 9/02
[52] U.S. Cl. ............................ 71/11; 71/27; 71/28; 71/29; 71/64 A; 71/92; 71/DIG. 1; 424/22
[58] Field of Search ............... 71/1, 11, 27, 28, 64 F, 71/92, DIG. 1, 64 SC, 64 A, 29, 34, 31; 424/22; 427/212, 221; 428/407

[56] References Cited

U.S. PATENT DOCUMENTS

| | | | |
|---|---|---|---|
| 3,024,098 | 3/1962 | Austin et al. | 71/64 F |
| 3,091,574 | 5/1963 | Coletta et al. | 71/DIG. 1 |
| 3,336,129 | 8/1967 | Herrett et al. | 71/92 |
| 3,490,742 | 1/1970 | Nichols et al. | 71/DIG. 1 |
| 3,900,378 | 8/1975 | Yen et al. | 71/64 SC |
| 3,901,969 | 8/1975 | Cohen et al. | 424/22 |
| 3,975,513 | 8/1976 | Hecht et al. | 424/22 X |

*Primary Examiner*—Wilbur L. Bascomb, Jr.
*Assistant Examiner*—Ferris H. Lander
*Attorney, Agent, or Firm*—Stevens, Davis, Miller & Mosher

[57] ABSTRACT

A substantially dry fertilizer tablet which is adapted to absorb water and disintegrate comprises particles of fertilizer source materials and particles of a water insoluble, water swellable, hydrophilic polymeric gel pressed together into a dense tablet bonded together by a cured water insoluble thermoset resinous binder such as urea formaldehyde.

17 Claims, No Drawings

DISINTEGRATABLE FERTILIZER TABLET

This invention relates generally to a plant growth modifier and more particularly to an improved fertilizer in tablet form.

It has been proposed heretofore to prepare fertilizer in tablet form. For example, a compressed fertilizer product for use in transplanting young trees is disclosed in U.S. Pat. No. 3,024,098. The disclosed fertilizer tablet is made by firmly compressing a phosphorous compound, a urea formaldehyde polymer which will release nitrogen to the soil or a mixture thereof. A fertilizer pill or briquette is disclosed in U.S. Pat. No. Re. 27,238. This prior art pill is prepared by firmly compressing a mixture of finely divided fertilizer materials and an inert filler and then coating the pill with wax to retard the solubility of the fertilizer materials in water.

Fertilizer in tablet form is very convenient for fertilizing various kinds of plants grown in pots. For example, a wholesale nurseryman can use the tablet to add a measured amount of fertilizer to a potted plant which is calculated to sustain the plant until it has been resold by the retailer. The wholesaler often sells the plant in mixtures of peat moss and sand or similar mixtures which do not include soil so the fertilizer tablet is the only source of plant food in the pot.

The heretofore available tablets or pills prepared by compressing fertilizer source materials or fertilizer source materials and inert fillers have not been entirely successful because they dissolve so slowly in water. The tablets must be firmly compressed to a high density to avoid substantial crumbling or shattering prior to use and are so hard that they disintegrate very slowly when placed in the pot. Consequently, they release plant food very slowly into the potting medium. In fact, such tablets may not supply a significant quantity of plant food until several days after the plant has been potted.

This problem has been recognized and fertilizer tablets which are said to avoid the problem are disclosed in U.S. Pat. Nos. 3,338,700 and 3,369,884. The tablet disclosed in U.S. Pat. No. 3,338,700 contans alginic acid or one of its water soluble salts. The alginic acid dissolves very readily in water when it is added to the soil and the tablet disintegrates. While this tablet may disintegrate, it has the disadvantage of requiring the use of a special lubricant which permits the water to enter the tablet. Moreover, the tablets are so susceptible to water and disintegration that they often break up prematurely. The tablet disclosed in U.S. Pat. No. 3,369,884, on the other hand, contains vermiculite as a disintegrating material and lubricant. This tablet has the disadvantage that it contains a substantial amount of solid inert filler which does not contribute significantly to the growth of the plant.

It is an object of this invention to provide an improved fertilizer tablet which is devoid of the foregoing disadvantages. Another object of the invention is to provide a novel fertilizer tablet which disintegrates and releases plant food into the potting medium when contacted with water. Still another object of the invention is to provide an improved fertilizer tablet adapted to disintegrate in the soil and release its fertilizer components along with a plant modifier which improves the utilization of the fertilizer by a plant. A still further object of the invention is to provide an improved fertilizer tablet pressed to a density whereby any premature crumbling and shattering occur only in insignificant amounts and the tablet disintegrates to expose fertilizer source materials over a significantly increased surface area while providing the planting medium with a material which contributes to the modification of the plant's growth.

The foregoing objects and others are accomplished in accordance with this invention, generally speaking, by providing a fertilizer tablet containing a compressed, substantially uniform mixture of granular fertilizer source materials and particles of a water insoluble, water swellable hydrophilic organic polymer which has the ability to reversibly sorb and desorb water and aqueous solutions. The water swellable polymer is a gel-like material which is subdivided into particles and is mixed while substantially anhydrous with a granular fertilizer source material. A suitable binder may be included in the mixture. The mixture is compressed into the shape of a tablet or a similarly shaped pellet on a conventional tabletting press or a briquetting apparatus to a density whereby the tablet will resist significant crumbling or other disintegration while it remains in its substantially anhydrous condition.

If the tablet is to be stored for any appreciable time before it is used, it may be packaged in a substantially waterproof package such as a plastic film container so that the tablet will not be exposed to water or moist air. When the tablet is placed in moist soil or other plant growth media near the roots of a plant, water from the soil will be absorbed by the hydrophilic polymeric gel which will expand and cause disintegration of the tablet. Since the exposed surface area of the fertilizer particles is greatly increased upon disintegration, the fertilizer is more soluble in water and thus is more effective as a fertilizer than it was while still in the hard tablet form. The particles of hydrophilic polymeric gel retain the absorbed water until the moisture content of the surrounding soil is depleted. At this time, the gel particles will release moisture into the soil and thus assist in the continued solubilization of the fertilizer to sustain plant growth. Hence, the tablet provided by the invention not only provides plant food in a convenient form but provides a material which assists in the efficient solubilization of the fertilizer.

Any suitable substantially water insoluble hydrophilic polymeric gel may be used as a disintegrating agent in the tablet of this invention. Suitable hydrophilic polymeric gels are disclosed, for example, U.S. Pat. No. 3,336,129. This polymer is an irradiation cross-linked poly(alkylene oxide) polymer such as, for example, poly(ethylene oxide), poly(propylene oxide), poly(butylene oxide) or the like. Other similar polymers which are suitable for use in the invention are those disclosed in U.S. Pat. No. 3,900,378. The disclosures in these patents are incorporated herein by reference. The hydrophilic gel particles are dehydrated after cross-linking and ground to a fine particle size. The gel particles are often mixed with an inert filler such as wood flour.

The fertilizer source materials may be any of the conventional granular fertilizer source materials which contain phosphorous, potassium or nitrogen. A preferred source of nitrogen is a urea formaldehyde resin which is slowly soluble in water such as the Ureaform sold commercially by E. I. duPont de Nemours Company as "Uramite." Urea or ammonium sulfate may be used as the source of nitrogen. Diammonium phosphate may be used as a source of both nitrogen and phosphorous. Alternately, super phosphate or triple super phosphate, a phosphate rock containing three times as much phosphoric acid as super phosphate, may be used as the source of phosphorous. Potassium chloride, potassium sulfate or other potassium salt may be used to provide the potash. Suitable fertilizer source materials are disclosed, for example, by Gay in U.S. Pat. No. 3,892,552, the disclosure of which is incorporated herein by reference.

Trace elements and secondary nutrients such as calcium, magnesium and sulfur may be included in the mixture, if desired. The trace elements may include iron, copper, manganese, barium, zinc, molybdenum, chlorine, vanadium, selenium, sodium or any other element required by a plant.

Any suitable resinous binder may be included in the tablet to bond the particles of fertilizer and disintegrating agent together after they have been compressed. This binder may be any suitable water soluble or water insoluble resin such as, for example, polyacrylamide or a thermosetting resin such as ureaformaldehyde resin, melamine formaldehyde resin or phenol formaldehyde resin. A preferred binder is the water insoluble ureaformaldehyde resin sold by Monsanto Company as "UF-71." Suitable binders are disclosed in the aforesaid Gay patent. The resinous binder is mixed with the hydrophilic gel particles, fertilizer source materials and inert filler if one is included in the tablet while uncured, the mixture is molded into the desired shape, and the resinous binder cures.

The urea formaldehyde or other resinous binder is not expected to contribute to the plant nutrients since it is a synthetic resin which is substantially insoluble in water. The urea-formaldehyde resin contemplated as a binder may be prepared from a mixture of urea and formaldehyde in a ratio ranging from about 1 mole urea per 1.38 to 1.8 moles formaldehyde.

Ordinarily, the binder will be less than about 10 percent by weight of the mixture which is shaped into a tablet but it can be as much as 15 percent by weight. The remainder of the mixture is composed of the hydrophilic polymeric gel preferably those materials used to supply the NPK values and a minor amount of inert filler required to adjust the NPK values to the desired level. Usually the amount of inert filler will be less than about 15 percent by weight but, in some instances, it may be as much as about 50 percent by weight of the tablet. The amount of moisture in the tablet must be less than that which will cause the hydrophilic polymeric gel to expand and cause disintegration of the tablet. It is believed that the binder is moisture cured. The moisture may be made available by exposure to the atmosphere until the resin is cured or it may be present in one or more of the NPK source materials.

The components of the tablet should be mixed in a ratio to provide the desired "NPK". Conventional fertilizer products have NPK values of 16:8:8; 8:4:4; 5:5:5; 15:5:5; 20:5:10, etc. For use with potted plants, it is preferred to mix the fertilizer source materials in such a ratio that the mixture has an NPK of 20:5:10 and contains about 3–6% by weight of the resinous binder material and sufficient hydrophilic polymeric gel to provide from about 0.1 pound to about 2 pounds per 100 pounds of the fertilizer and binder mixture. However, the fertilizer composition may contain from about 5–30% slowly water soluble nitrogen, 0–40% phosphorous as $P_2O_5$, 0–40% potash as $K_2O$ and the indicated amounts of binder and hydrophilic polymeric gel. Any suitable inert filler may be added to the tablet such as, for example, limestone, clay, sawdust or the like.

The fertilizer tablet provided by the invention disintegrates into fertilizer particles and swollen gel particles when water is abosrbed by the hydrophilic, polymeric, water insoluble gel particles. This results in the particles of the hard tablet breaking up into finely divided fertilizer source materials having a large surface area exposed to moisture in the soil and swollen gel particles containing sorbed water. The nitrogen, phosphorous and potash in the fertilizer source materials will become available to the root system of a plant much more rapidly from the particulate fertilizer than from a firmly compressed tablet of limited surface area. The particles of hydrophilic polymer gel will retain the sorbed water until the moisture content of the surrounding plant growth media is depleted at which time water will be released to the soil. Hence, the tablet acts to some extent as a buffer against damage to the plant if moisture in the plant media is not replenished when needed.

EXAMPLE 1

One embodiment of the invention is prepared by mulling a mixture of about 52.5 parts by weight "Uramite" containing 38% nitrogen, about 11 parts by weight triple super phosphate containing 46% phosphorous as $P_2O_5$, about 20 parts by weight potassium sulfate, about 0.2 part by weight Union Carbide's "Viterra" a commercially available hydrophilic polymeric gel-inert filler (wood-flour) particles, about 7 parts "UF-71"0 urea formaldehyde resin binder and about 9.3 parts limestone filler until a substantially uniform mixture is obtained. This mixture may contain moisture in an amount which is sufficient to cure the binder and form a tablet which can be packaged and handled without significant disintegration. The mixture is compressed in a suitable die to form a disc-shaped product weighing about 20 grams. The tablets may be packaged immediately in a waterproof package such as a box enclosed in a plastic film or in a plastic bag such as one made from polyvinyl chloride film and closed by heat sealing. The moisture in the mixture will cure the binder.

EXAMPLES 2 – 3

Example 1 is repeated except the mixture is molded into tablets of 5 and 10 grams, respectively.

The weight of the tablet may be varied depending upon the volume of planting media to be fertilized, the fertilizer composition, the type of plant to be fertilized and the period of time the tablet will be expected to modify plant growth. Usually, however, the tablet weight will be within the range of about 1 gram to 25 grams. The tablets are particularly advantageous for use with plants grown in pots or beds because they provide a convenient means for adding measured amounts of fertilizer to the planting media but they can of course be used for fertilizing plants grown in fields, gardens or other large areas.

It will be noted that the fertilizer tablet provided by this invention has the unique advantage of having particles of fertilizer source materials bonded together by a water insoluble thermoset resin but containing particles of an organic hydrophilic polymer which will swell when water penetrates the tablet and break the bond to cause the tablet to disintegrate into its particulate constituents. Moreover, the particles of hydrophilic gel remaining in the soil in proximity with the fertilizer particles will release moisture when the moisture in the planting media is depleted.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A hygroscopic plant fertilizer tablet comprising particles of plant fertilizer source materials said source materials comprising nitrogen, phosphorus or potassium or mixtures thereof mixed with particles of a water swellable, water insoluble hydrophilic polymeric gel compressed into a hard, dense tablet.

2. The fertilizer tablet of claim 1 containing inert, inorganic filler particles.

3. The fertilizer tablet of claim 1 containing about 5 to 30% slowly soluble nitrogen, phosphorous equivalent to about 0 to 40% $P_2O_5$ and potash equivalent to about 0 to 40% $K_2O$.

4. The fertilizer tablet of claim 1 containing a binder.

5. The fertilizer tablet of claim 4 wherein the binder is a cured resin.

6. The fertilizer tablet of claim 4 containing about 0.1 to about 2 parts by weight hydrophilic polymeric gel per 100 parts mixture including the binder.

7. The fertilizer tablet of claim 1 wherein the hydrophilic polymeric gel is a poly(alkylene oxide) polymer.

8. The fertilizer tablet of claim 6 wherein the poly(alkylene oxide) polymer is poly(ethylene oxide) polymer.

9. The fertilizer tablet of claim 1 wherein the particles of hydrophilic polymeric gel are mixed with an inert filler.

10. A method for improving the disintegration of a unitary plant fertilizer product when exposed to moisture which comprises mixing with fertilizer source materials said source materials comprising nitrogen, phosphorus, or potassium or mixtures thereof a water swellable, water insoluble, hydrophilic polymeric gel and compressing the resulting mixture into a hard, dense unitary product.

11. The method of claim 10 wherein a binder is included in the mixture which is compressed to form the unitary product.

12. A method for making a unitary fertilizer product which when exposed to moisture will disintegrate and release plant food into the surrounding soil which comprises mixing fertilizer source materials and a water swellable, water insoluble hydrophilic polymer gel and compressing the resulting mixture into a hard, dense unitary product.

13. A method for fertilizing a plant which comprises associating with the plant's roots a unitary fertilizer product containing a mixture of fertilizer source materials and a water swellable, water insoluble, hydrophilic polymeric gel.

14. The method of claim 11 wherein from about 0.1 to about 2 parts by weight hydrophilic polymeric gel per 100 parts mixture are mixed with the fertilizer source materials and binder.

15. The method of claim 12 wherein a binder is mixed with the fertilizer source materials and from about 0.1 to about 2 parts by weight hydrophilic polymeric gel per 100 parts mixture are mixed with the fertilizer source materials and binder.

16. The method of claim 13 wherein the unitary fertilizer product contains a binder and from about 0.1 to about 2 parts by weight of the hydrophilic polymeric gel per 100 parts mixture.

17. A hygroscopic plant fertilizer tablet comprising particles of fertilizer source materials said source materials comprising nitrogen, phosphorus, or potassium or mixtures thereof, mixed with particles of a water swellable, water insoluble hydrophilic polymeric gel compressed into a hard, dense tablet, whereby said tablet when disposed in soil and exposed to moisture absorbs water with swelling of the hydrophilic polymeric gel and disintegration of the tablet into particles which present a greater surface area for release of fertilizer source materials into the soil.

* * * * *